US012142800B1

(12) United States Patent
Wilson

(10) Patent No.: US 12,142,800 B1
(45) Date of Patent: Nov. 12, 2024

(54) PASSIVE PRESSURE SWING SYSTEM FOR FUEL CELL REACTANT RECIRCULATION

(71) Applicant: Triad National Security, LLC, Los Alamos, NM (US)

(72) Inventor: Mahlon Scott Wilson, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 456 days.

(21) Appl. No.: 17/360,554

(22) Filed: Jun. 28, 2021

Related U.S. Application Data

(60) Provisional application No. 63/074,255, filed on Sep. 3, 2020.

(51) Int. Cl.
*H01M 8/04089* (2016.01)
*H01M 8/04119* (2016.01)
*H01M 8/04746* (2016.01)
*H01M 50/325* (2021.01)

(52) U.S. Cl.
CPC ... *H01M 8/04104* (2013.01); *H01M 8/04164* (2013.01); *H01M 8/04783* (2013.01); *H01M 50/325* (2021.01)

(58) Field of Classification Search
CPC ......... H01M 8/04104; H01M 8/04783; H01M 8/04432; H01M 8/04; H01M 50/30–40; H01M 50/325
See application file for complete search history.

(56) References Cited

U.S. PATENT DOCUMENTS

| | | | |
|---|---|---|---|
| 5,441,821 A | 8/1995 | Merritt et al. | |
| 5,783,051 A * | 7/1998 | Hirai | C25B 9/05 204/255 |
| 6,116,576 A * | 9/2000 | Hoglund | F16K 7/14 251/129.17 |
| 2004/0072040 A1 * | 4/2004 | Duffy | C25B 1/04 204/278 |

(Continued)

OTHER PUBLICATIONS

De Grisard, Benjamin et al., "Long Term Performance of the Pressure Swing Recirculation System," HAL archives-ouvertes, https://hal-mines-paristech.archives-ouvertes.fr/hai-01112582, submitted on Feb. 3, 2015.

(Continued)

*Primary Examiner* — Imran Akram
(74) *Attorney, Agent, or Firm* — Alston & Bird LLP

(57) ABSTRACT

Various embodiments are directed to a passive pressure swing valve, a passive pressure swing system for fuel cell reactant recirculation, and methods of using the same. In various embodiments, a passive pressure swing system may comprise a reactant supply configured to dispense a volume of reactant fluid to a fluid flow path; a fuel cell configured to receive at least a portion of the volume of reactant fluid; a passive pressure swing valve arranged in-line with the fluid flow path; and a reservoir arranged in-line with the fluid flow path and configured to receive one or more of a portion of the volume of reactant fluid and a volume of byproduct water displaced from the fuel cell; wherein the fluid flow path is configured to deliver the volume of reactant fluid to one of an anode or a cathode of the fuel cell.

19 Claims, 6 Drawing Sheets

(56) References Cited

U.S. PATENT DOCUMENTS

| | | | | |
|---|---|---|---|---|
| 2005/0221147 A1* | 10/2005 | Shioya | F16K 31/1266 | 429/513 |
| 2007/0026269 A1* | 2/2007 | Nakakubo | F16K 99/0001 | 137/859 |
| 2007/0193340 A1* | 8/2007 | Yoshida | H01M 8/04231 | 73/46 |
| 2009/0075128 A1* | 3/2009 | Sadamoto | H01M 8/04208 | 429/410 |
| 2010/0035106 A1* | 2/2010 | Osada | H01M 8/04126 | 429/515 |
| 2010/0227241 A1* | 9/2010 | Sarata | F16K 31/365 | 137/528 |
| 2013/0199646 A1* | 8/2013 | Brammer | B01L 3/50273 | 137/833 |
| 2019/0157694 A1* | 5/2019 | Uchimura | H01M 8/04302 | |
| 2021/0098803 A1* | 4/2021 | Kajio | B01D 45/08 | |

OTHER PUBLICATIONS

Kurnia, Jundika C. et al., "Advances in proton exchange membrane fuel cell with dead-end anode operation: A review," Applied Energy, 252:113416, (2019).

Uno, Masatoshi et al., "Reactant recirculation system utilizing pressure swing for proton exchange membrane fuel cell," Journal of Power Sources, 196:2558-2566, (2011).

Wilson, Mahlon S., "Description of Passive Pressure Swing System for Fuel Cell Reactant Recirculation," 8 pgs., (Mar. 26, 2020).

Yang, Yupeng et al., "Degradation mitigation effects of pressure swing in proton exchange membrane fuel cells with dead-ended anode," International Journal of Hydrogen Energy, 42:24435-24447, (2017).

Yang, Yupeng et al., "Mechanisms of voltage spikes and mitigation strategies for proton exchange membrane fuel cells with dead-ended anode under pressure swing operation," International Journal of Hydrogen Energy, 42:28578-28587, (2017).

Yang, Yupeng et al., "Different flow fields, operation modes and designs from proton exchange membrane fuel cells with dead-ended anode," International Journal of Hydrogen Energy, 43:1769-1780, (2018).

Zhao, Jing et al., "Experimental study on water management improvement of proton exchange membrane fuel cells with dead-ended anode by periodically supplying fuel from anode outlet," Journal of Power Sources, 435:226775, (2019).

Zhao, Jing et al., "Visualization study on enhancing water transport of proton exchange membrane fuel cells with a dead-ended anode by generating fluctuating flow at anode compartment," Energy Conversion and Management, 206:112477, (2020).

\* cited by examiner

PASSIVE PRESSURE SWING SYSTEM FOR FUEL CELL REACTANT RECIRCULATION

CROSS-REFERENCE TO RELATED APPLICATIONS

The present application claims priority to, and the benefit of, U.S. Provisional Patent Application No. 63/074,255, filed Sep. 3, 2020, entitled "Passive Pressure Swing System for Fuel Cell Reactant Recirculation," the entire disclosure of which is hereby incorporated herein by reference in its entirety for all purposes.

GOVERNMENT SUPPORT STATEMENT

The United States government has certain rights in this invention pursuant to Contract No. 89233218CNA000001 between the United States Department of Energy and TRIAD National Security, LLC for the operation of Los Alamos National Laboratory.

BACKGROUND

Related Field

Various embodiments described herein relate generally to fuel cell technology. In particular, various embodiments are directed to a fuel cell water management system configured for removing an accumulated volume of byproduct water from within a fuel cell.

Related Art

Industrial and commercial applications may use fuel cells as a high-energy power source. In particular, a system for fuel cell reactant recirculation may be used to prevent reactant starvation and to remove byproduct water accumulated within a fuel cell. Fuel cells produce water as a byproduct, which unless removed blocks reactant access (flooding) resulting in a loss of performance. In most terrestrial fuel cells this is only a problem on the anode side (hydrogen reactant) since air is typically used at the cathode, which because of the low oxygen concentration, is supplied at rate that easily sweeps out the bulk of the product water as it is formed at the cathode side in polymer electrolyte fuel cells. In some systems, a simple periodic vent to atmosphere suffices to purge the anode water, although hydrogen fuel is lost. In more sophisticated "dead-ended" systems that conserve reactant, recirculation is induced through the fuel cell stack by a small pump or a vacuum ejector to remove the water accumulated at the anode. Another dead-ended approach is to use pressure swing, whereupon the reactant supply is valved on and off to refill and discharge a reservoir downstream of the stack, thus inducing a purging flow through the stack. Typically, an electromechanical valve and pressure switches or a pressure transducer and logic circuitry are used to control the pressure swing. Aside from the vacuum ejector induced recirculation which performs poorly with low flows, high water contents, or high flow-field pressure drops, the remaining approaches consume reactant directly, or indirectly as electrical power. Consequently, there are benefits to a water purge and reactant recirculation approach that can operate with low flows, high water contents, high pressure drops, and with no parasitic power requirements or fuel loss. Ideally, the approach would be passive, in that it would not require electrical power or other external energy input.

Through applied effort, ingenuity, and innovation, Applicant has solved problems relating to fuel cell reactant recirculation systems by developing solutions embodied in the present disclosure, which are described in detail below.

BRIEF SUMMARY

Various embodiments are directed to a passive pressure swing system for fuel cell reactant recirculation and method of using the same. In various embodiments, a passive pressure swing system for fuel cell reactant recirculation may comprise a reactant supply configured to dispense a volume of reactant fluid to a fluid flow path; a fuel cell configured to receive at least a portion of the volume of reactant fluid; a passive pressure swing valve arranged in-line with the fluid flow path, the passive pressure swing valve being configurable between an open valve configuration and a closed valve configuration; a reservoir arranged in-line with the fluid flow path and configured to receive one or more of a portion of the volume of reactant fluid and a volume of byproduct water displaced from the fuel cell; wherein the fluid flow path is configured to deliver the volume of reactant fluid to one of an anode or a cathode of the fuel cell.

In various embodiments, a passive pressure swing fuel cell reactant recirculation system may be used on one or more of the anode and the cathode. In various embodiments, the reactant fluid may comprise hydrogen supplied to the anode. In various embodiments, the reactant fluid may comprise oxygen supplied to the cathode. In various embodiments, the passive pressure swing valve may comprise a first fluid channel and a second fluid channel; and the passive pressure swing valve may be configurable between the open valve configuration and the closed valve configuration based at least in part on a pressure differential between a first fluid channel pressure and a second fluid channel pressure within the passive pressure swing valve, wherein the first fluid channel is in fluid communication with the second fluid channel.

In various embodiments, the system may be further configured to remove at least a portion of an accumulated volume of byproduct water from within the fuel cell utilizing at least a portion of the volume reactant fluid. In certain embodiments, the system may be further configured to remove at least substantially all of an accumulated volume of byproduct water from within the anode of the fuel cell utilizing at least a portion of the volume reactant fluid. Further, in certain embodiments, the system may be further configured to remove at least substantially all of an accumulated volume of byproduct water from within the cathode of the fuel cell utilizing at least a portion of the volume of reactant fluid.

In various embodiments, the anode reservoir may be defined by an anode reservoir volume, wherein the reservoir volume is greater than the fuel cell stack anode volume of the fuel cell stack anode. In various embodiments, the cathode reservoir may be defined by a cathode reservoir volume, wherein the cathode reservoir volume is greater than a fuel cell stack cathode volume of the fuel cell stack cathode. In various embodiments, the system may further comprise a pressure regulator configured to define a reactant fluid pressure of the volume of reactant fluid at an inlet of the passive pressure swing valve. In various embodiments, the passive pressure swing valve may be arranged along the fluid flow path between the reactant supply and the fuel cell such that the fluid flow path extends between the reactant supply and a passive pressure swing valve first fluid channel, between the passive pressure swing valve first fluid channel and the fuel cell, between the fuel cell and the reservoir, and between the reservoir and a passive pressure swing valve second fluid channel; and wherein the system is configured to facilitate a bi-directional flow of reactant fluid through the fuel cell. Further, In various embodiments, the passive pressure swing valve may be arranged along the fluid flow path between the reactant supply and the fuel cell such that the fluid flow path extends between the reactant supply and a passive pressure swing valve first fluid channel, between the passive pressure swing valve first fluid channel and the fuel cell, between the fuel cell and a first forward check valve, between the first forward check valve and the reservoir, and between the reservoir and a passive pressure swing valve second fluid channel, wherein the fluid flow path further comprises a spur path extending between the reservoir and an inlet of the fuel cell, the spur path comprising a second forward check valve arranged between the reservoir and the fuel cell inlet; wherein the system is configured to facilitate a uni-directional flow of reactant fluid through the fuel cell.

Various embodiments described herein are directed to a passive pressure swing valve comprising: a valve body; a first fluid channel; a second fluid channel; a mobile separator arranged at least substantially between the first fluid channel and the second fluid channel; and a seal system comprising one or more magnetic components configured to apply one or more forces to the mobile separator; wherein the mobile separator is configurable between an open configuration position and a closed configuration position; and wherein the first fluid channel is in fluid communication with the second fluid channel. The closed and open configuration positions may correspond to the closed and open valve configurations, respectively.

In various embodiments, the mobile separator may be a diaphragm. In various embodiments, the mobile separator may be a piston. In various embodiments, the passive pressure swing valve may be configurable between an open valve configuration and a closed valve configuration based at least in part on the mobile separator configuration. In various embodiments, the one or more forces applied to the mobile separator may correspond to one or more of a first fluid channel pressure, a second fluid channel pressure, and a magnetic force. In various embodiments, the passive pressure swing valve may further comprise a guide rod disposed within the second fluid channel and configured to at least partially control the alignment of the mobile separator as it transitions between the closed configuration and the open configuration position. In various embodiments, the passive pressure swing valve may be configured such that the mobile separator may define a substantially variable closing force when moving between the open configuration position and the closed configuration position.

In certain embodiments, the substantially variable closing force of the mobile separator may be based at least in part on the one or more forces generated by the seal system. In various embodiments, the passive pressure swing valve may be configured such that the mobile separator does not require electrical power to move either from the open configuration position to the closed configuration position or from the closed configuration position to the open configuration position. The closed and open configuration positions may correspond to the closed and open valve configurations, respectively.

BRIEF DESCRIPTION OF THE DRAWINGS

Reference will now be made to the accompanying drawings, which are not necessarily drawn to scale, and wherein.

DETAILED DESCRIPTION

Figure 1:
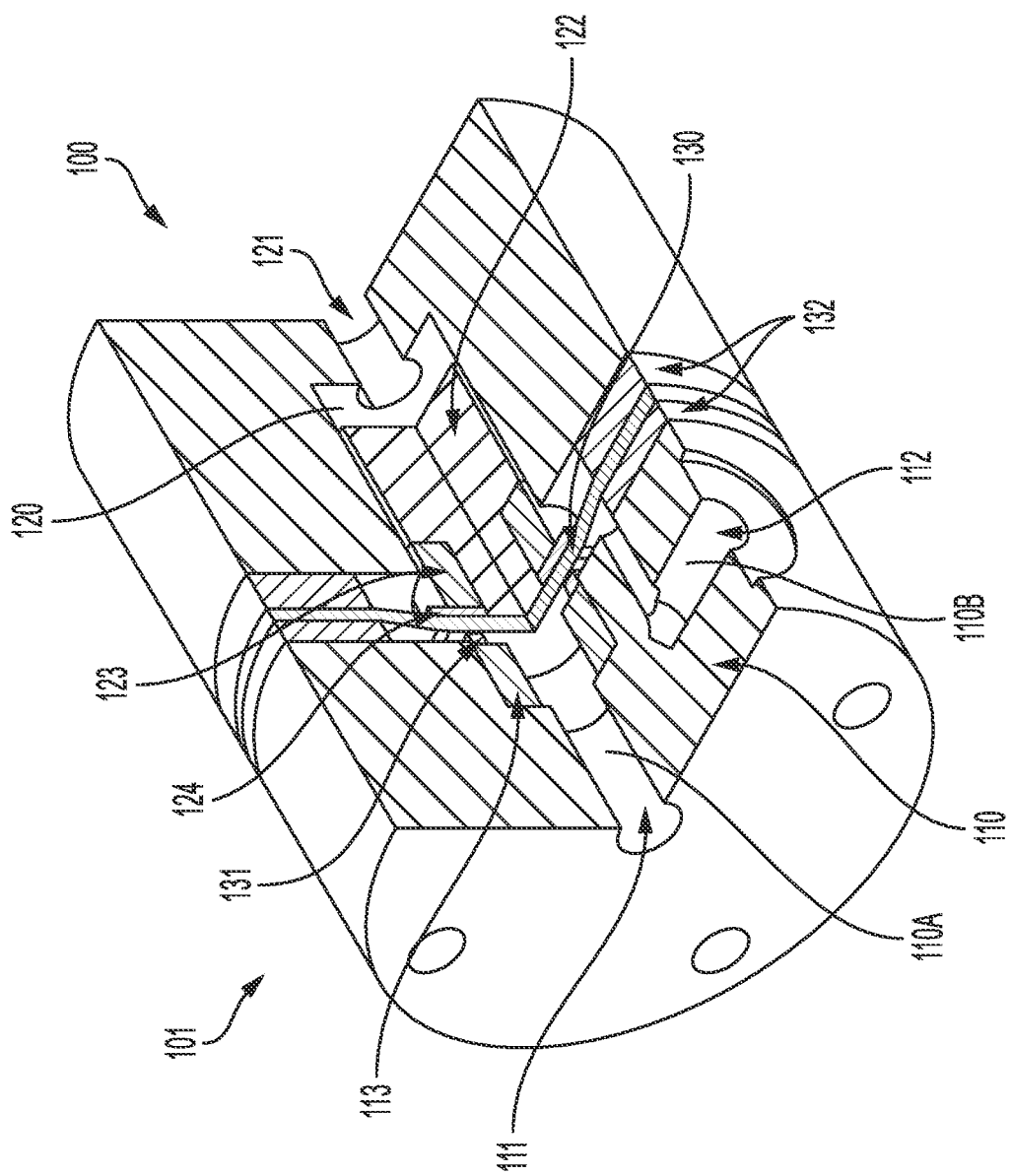
FIG. 1 illustrates a partial perspective view of an exemplary passive pressure swing valve according to various embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Overview

The present invention described herein comprises a passive pressure swing system that functionally eliminates the need for electrical power or other external energy input. The present invention described herein may be configured so as to function within a closed-loop system while simultaneously embodying an efficient solution for removing at least substantially all of the volume of byproduct water accumulated within a fuel cell throughout the operation thereof. Further, the exemplary passive pressure swing system described herein is configured to enable at least substantially perpetual system operability, wherein the passive pressure swing system may be defined by a self-sustaining configuration that does not require external energy input-such as, for example, by electrical power-such that the system may at least substantially continuously execute serial pressure swings in order to operate for an at least substantially perpetual and/or indefinite amount of time without requiring any user interaction.

Further, in various embodiments, the present invention described herein may comprise either a uni-directional or bi-directional configuration. For example, a system comprising a bi-directional configuration may eliminate the need for various mechanical components, such as, for example, a check valve, that may be used in traditional uni-directional systems. By reducing the need for such potentially extraneous mechanical components, the present invention described herein may reduce the production costs of the system while being configured to maintain operability at extreme temperatures that may render more traditional systems known in the prior art inoperable.

Pressure Swing Valve

Various embodiments described herein are directed to a valve configured to effectively facilitate a passive pressure swing system for fuel cell reactant recirculation. For example, FIG. 1 illustrates a partial cross-sectional view of an exemplary valve 100 according to various embodiments. In particular, valve 100 may comprise a passive pressure swing valve. In various embodiments, a valve 100 may comprise a valve body 101 that defines at least a portion of the exterior of the valve 100. In various embodiments, the valve body 101 may define a first fluid channel 110 and a second fluid channel 120, each of which may comprise a channel extending throughout the valve body 101 that is configured to receive a volume of fluid (e.g., gas) and define a portion of a fluid flow path along which the volume of fluid may travel. For example, in various embodiments, the first and second fluid channels 110, 120 may define at least a portion of a fluid flow path within a passive pressure swing system, as described herein. In various embodiments, the valve 100 may further comprise a mobile separator configured to physically separate the first fluid channel 110 from the second fluid channel 120 within the valve body 101. As illustrated in FIG. 1, the mobile separator of the valve 100 may comprise a diaphragm 130. Alternatively, or additionally, in various embodiments, the mobile separator may comprise a bellows, a gas-tight piston, and/or one or more mechanical valve components configured to define an open valve configuration and a closed valve configuration and facilitate a transition therebetween.

As illustrated, the first fluid channel 110 of the valve 100 may be defined in part by a first fluid channel inlet 111 comprising an orifice arranged about an exterior of the valve body 101 through which the first fluid channel 110 may be configured to receive a volume of fluid. In various embodiments wherein a diaphragm 130 of the valve 100 is configured in an open position, as described below in further detail, the first fluid channel 110 may extend from the first fluid channel inlet 111 within the valve body 101 to a first fluid channel outlet 112. The first fluid channel outlet 112 may comprise an orifice arranged about an exterior of the valve body 101 through which a volume of fluid flowing within the first fluid channel 110 may be dispensed from the valve body 101 (e.g., from the first fluid channel 110). As described herein, in various embodiments wherein the diaphragm 130 is in an open configuration, a volume of fluid received by the valve 100 at the first fluid channel inlet 111 may flow continuously through the first fluid channel 110 to the first fluid channel outlet 112. Conversely, in various embodiments wherein the diaphragm 130 is in a closed configuration, the diaphragm 130, as described herein, may be configured to interrupt the fluid flow path within the first fluid channel 110 such that a volume of fluid received by the valve 100 at the first fluid channel inlet 111 is prevented from continuously flowing to the first fluid channel outlet 112. In such an exemplary circumstance, as illustrated in FIG. 1, the first fluid channel 110 may be defined, at least in part, by an inlet first fluid channel portion 110A (arranged fluidly adjacent the first fluid channel inlet 111) and an outlet first fluid channel portion 110B (arranged fluidly adjacent the first fluid channel outlet 112), which are fluidly obstructed by the diaphragm 130 when in the closed position. In various embodiments wherein the exemplary valve 100 defines a portion of a passive pressure swing system, one or both of the first fluid channel inlet 111 and the first fluid channel outlet 112 may be arranged in-line with (e.g., fluidly connected to) a respective fluid flow conduit such that a volume of fluid received and/or dispensed by the valve 100 may be retained within the passive pressure swing system, as described herein. For example, in various embodiments, the first fluid inlet may be positioned downstream from a fluid supply source (e.g., a reactant gas tank) fluidly connected thereto. In such an exemplary circumstance, a first fluid channel pressure within the first fluid channel 110 (e.g., the inlet fluid channel portion 110A) may be defined at least in part by a predetermined pressure at which the fluid pressure source is configured to output a volume of fluid to the valve 100.

In various embodiments, as illustrated in FIG. 1, the valve 100 may comprise a diaphragm 130 configured to physically separate the first fluid channel 110 from the second fluid channel 120 within the valve body 101. For example, the diaphragm 130 may be configured to define a barrier between the first fluid channel 110 and the second fluid channel 120 such that a volume of fluid present within the first fluid channel 110 cannot travel directly to the second fluid channel 120 within the valve body 101. The diaphragm 130 may be defined at least in part by a diaphragm thickness. As illustrated, the diaphragm thickness may extend in a thickness direction between a first diaphragm surface and a second diaphragm surface, which may be configured as substantially planar opposite surfaces of the diaphragm 130. For example, in various embodiments, the diaphragm 130 may be configured such that the first diaphragm surface is interfaced at least partially with the first fluid channel 110 and the second diaphragm surface is interfaced at least partially with the second fluid channel 120 (or a valve 100 component arranged therein). In various embodiments, the diaphragm thickness may be at least substantially between 0.01 mm and 10 mm (e.g., between 0.1 mm and 3 mm).

As described herein, in various embodiments, the diaphragm 130 may be configurable between an open and a closed position, based at least in part on one or more instantaneous pressure characteristics present at one or more of the first fluid channel inlet 111 and the second fluid channel inlet 121. In various embodiments, the diaphragm 130 may be made of a flexible material such that the diaphragm 130 may transition between the open and closed configurations in response to one or more load conditions being applied thereto. As non-limiting examples, the diaphragm may comprise one or more of rubber, rubber-coated fabric, plastic, metal, and/or the like. The diaphragm may be flat, corrugated, or even pleated, commonly described as a bellows. In various embodiments, the diaphragm 130 may comprise an at least partially flexible configuration wherein a first portion of the diaphragm 130 may be least substantially secured relative to the valve body 101 (e.g., a static diaphragm portion) and may remain in a fixed position while an unrestricted second portion of the diaphragm 130 (e.g., a dynamic diaphragm portion) is configured to be displaced relative to both the valve body and the static diaphragm portion in response to a load condition being applied thereto. For example, as illustrated, the valve 100 may be configured such that an outer perimeter of the diaphragm 130 is secured relative to the valve body 101 so as to define the static diaphragm portion. In such an exemplary circumstance, a remaining inner area of the diaphragm 130 may define the dynamic diaphragm portion, which may be cantilevered about the static diaphragm portion and configured for bi-directional movement in the thickness direction to facilitate the transition of the diaphragm 130 between the closed and open configurations, as described herein.

Figure 2:
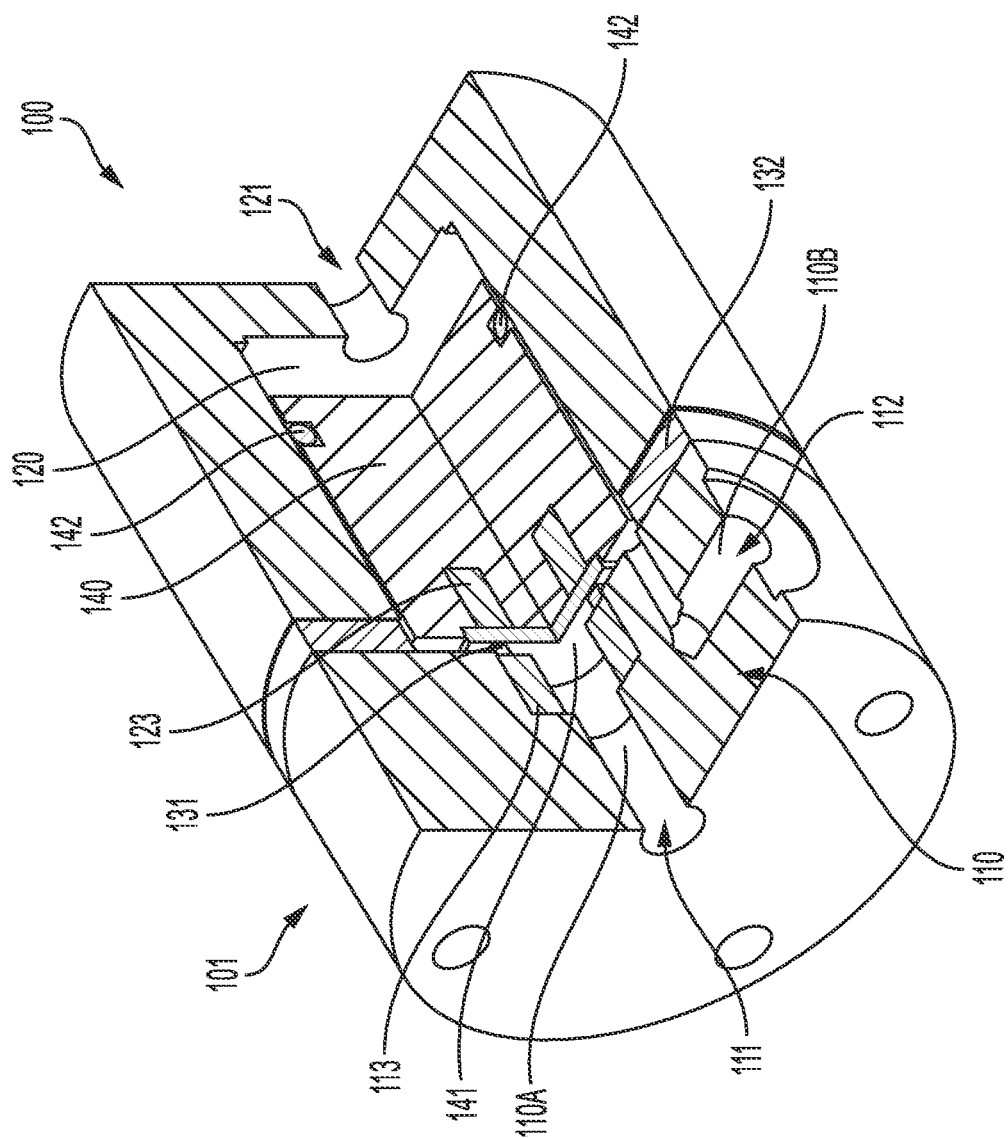
FIG. 2 illustrates a partial perspective view of an exemplary passive pressure swing valve according to various embodiments.

In various embodiments, an exemplary valve 100 may comprise a mobile separator embodied as a piston component arranged at least partially within the valve body 101. For example, FIG. 2 illustrates a partial cross-sectional view of an exemplary valve 100 according to various embodiments. In particular, FIG. 2 illustrates an exemplary valve 100 configuration wherein the mobile separator comprises a piston configured to transition between the open and closed configurations in response to one or more load conditions being applied thereto. As illustrated, the valve 100 may comprise a gas-tight piston component 140, a piston face seal 141, and a piston ring 142. In various embodiments, the exemplary valve 100 may be configured so as to allow the piston component 140 to move between an open piston configuration position and a closed piston configuration position, as described herein, corresponding to an open valve configuration and a closed valve configuration position, respectively. For example, at least a portion of the valve body 101 may comprise a bored configuration so as to closely mate with at least a portion of the piston component 140 (e.g., a piston component sidewall, a piston ring 142, and/or the like), thereby facilitating an air-tight seal about an outer perimeter of the piston component 140. In various embodiments, the piston component 140 may be made of a lightweight, non-magnetic material such that the weight of the component does not unduly compete with the other forces acting on the valve 100, as described herein. Further, although illustrated as a piston ring 142 configured to define a seal interface between the piston component 140 and the valve body 101 within the second fluid flow channel 120, it should be understood that the piston ring 142 may be embodied as one or more sealing components configured to provide an air-tight seal as described herein.

In various embodiments, the piston component 140 may comprise the piston face seal 141 secured thereto. The piston face seal 141 may be arranged about one or more external surfaces of the piston component 140 and configured to engage the valve seat 131 of the valve 100 so as to define an airtight seal therebetween and facilitate a closed valve configuration, as described herein. For example, the piston component 140 may be configured such that the piston face seal 141 is arranged at least partially inset from one or more adjacent external piston surfaces, as shown in FIG. 2. In various embodiments, the piston face seal 141 may be configured to function as a spacer gasket such that the piston face seal 141 may at least partially define a distance between the static and dynamic magnets 113,123 and thus the attractive force therebetween when the valve 100 is in a closed valve configuration. As a non-limiting example, a thickness of the piston face seal 141 may be at least substantially the same as that of an exemplary valve diaphragm described herein with respect to various embodiments. In such an exemplary circumstance, the exemplary valve 100 comprising the piston component 140 may be configured so as to define a closed distance that is at least substantially similar to that defined by the analogous valve embodiment comprising the diaphragm, factoring in that the described ferromagnetic face washer may effectively act as an extension of the dynamic magnet 123. Similarly, the diameter of the piston face seal 141 may be at least substantially the same as that of an exemplary diaphragm face plate 124—described herein with respect to the exemplary valve embodiment illustrated in FIG. 1—in order to provide a similar mating area to the valve seat 131. In various embodiments, the piston face seal 141 may comprise a material that is at least substantially similar to that of the exemplary diaphragm component described herein.

In various embodiments, the thickness of the piston face seal 141 may be critical to the spatial configuration (e.g., spacing considerations) of the valve 100 within the valve body 101. Further, the diameter of the piston face seal 141 may be critical to ensure that a seal is generated with the piston component 140 is arranged in a closed piston configuration position. In various embodiments, a thickness of the spacer gasket 132 may determine the maximum distance the piston component 140 can open, and thus, the attractive force between the magnets when the valve 100 is arranged in a fully open valve configuration. As illustrated, the thickness of the spacer gasket 132 and the bore depth of the dome (e.g., the valve body 101) may permit the magnets to separate a maximum distance as that described herein with respect to the exemplary valve 100 embodiment wherein the mobile separator is embodied as a diaphragm. For example, the depth of the bored configuration may account for a small lip at the base of the bore that may prevent the piston component 141 from occluding the pilot port 121.

In various embodiments, the second fluid channel 120 may comprise an opening within the valve body 101 configured to receive a volume of fluid and define a portion of a fluid flow path such that at least a portion of a volume of fluid within a fluid flow path may be present within the second fluid channel. In various embodiments, the second fluid channel 120 may be defined at least in part by the valve body 101 and the diaphragm 130. For example, as illustrated, the second fluid channel 120 may comprise a cylindrical chamber having an outer perimeter defined by an interior surface of the valve body 101 and an end surface defined by at least a portion of a surface of the diaphragm 130 (e.g., a dynamic diaphragm portion). For example, the second fluid channel 120 may be configured such that a second fluid channel pressure within the second fluid channel 120 may be defined at least in part by one or more characteristics of the volume of fluid present therein.

In various embodiments, the second fluid channel 110 of the valve 100 may be defined in part by a second fluid channel orifice 121 comprising an orifice arranged about an exterior of the valve body 101 through which the second fluid channel 120 may be configured to receive a volume of fluid. In various embodiments, second fluid channel 120 may comprise a substantially isolated chamber within the valve body such that the second fluid channel orifice 121 embodies the only interface between the second fluid channel 120 and an adjacent environment outside of the valve body 101 (e.g., a fluid flow conduit of a passive pressure swing system). In such an exemplary circumstance, the second fluid channel orifice 121 may be configured to both receive and/or dispense a volume of fluid so as to function as both an inlet and an outlet for the second fluid channel 120 based at least in part on one or more instantaneous pressure conditions. For example, in an exemplary circumstance wherein the pressure within the second fluid channel 120 is lower than the pressure in the environment immediately adjacent the second fluid channel orifice 121 outside of the valve 100, the second fluid channel orifice 121 may be configured to receive a volume of fluid travelling from the adjacent environment into the second fluid channel 120. Conversely, in an exemplary circumstance wherein the pressure within the second fluid channel 120 is higher than the pressure in the environment immediately adjacent the second fluid channel orifice 121 outside of the valve 100, the valve 100 may be configured such that a volume of fluid within the second fluid channel 120 may be dispensed through the second fluid channel orifice 121 to the adjacent environment. In various embodiments wherein the exemplary valve 100 defines a portion of a passive pressure swing system, the second fluid channel orifice 121 may be arranged in-line with (e.g., fluidly connected to) a fluid flow conduit such that a volume of fluid received and/or dispensed by the valve 100 at the second fluid channel orifice 121 may be retained within the passive pressure swing system, as described herein.

Figure 3A:
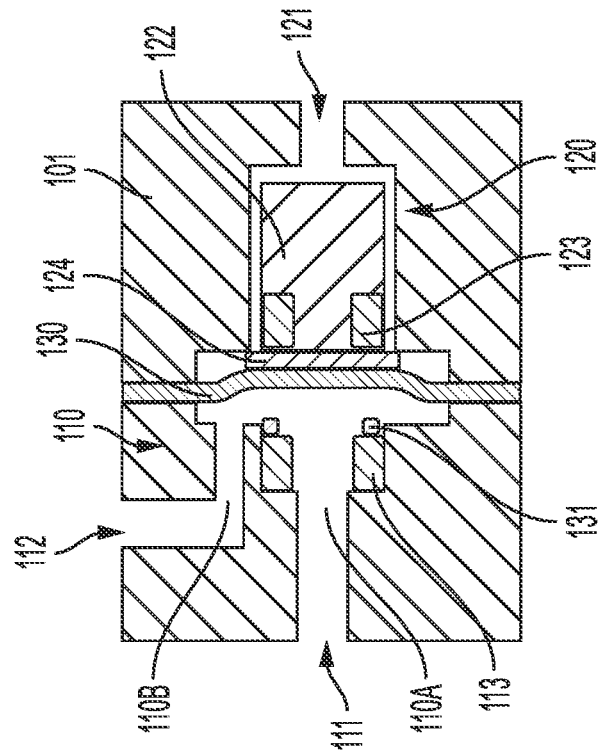
FIGS. 3A-3B illustrate a cross-sectional view of an exemplary passive pressure swing valve according to various embodiments.
Figure 3B:
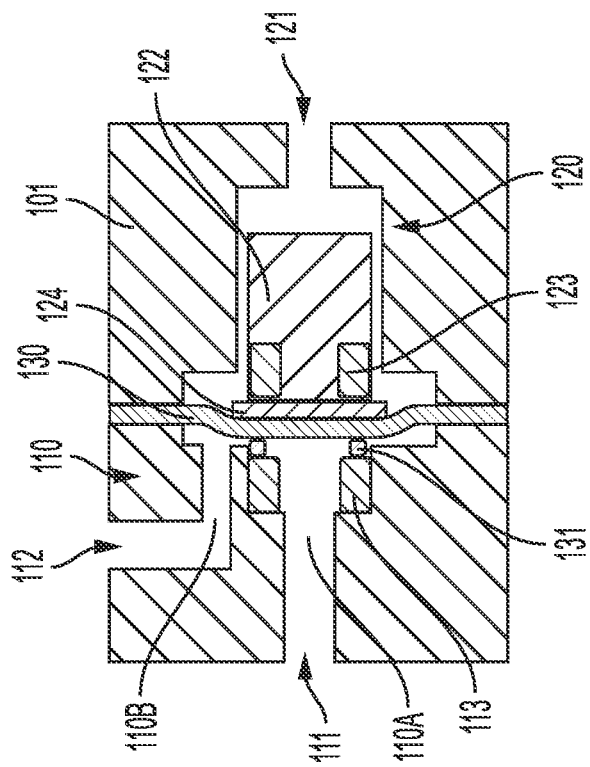

As described herein, a volume of fluid within the second fluid channel 120 may contribute, at least in part, to a second fluid channel pressure within the second fluid channel 120. In various embodiments, As illustrated in FIGS. 3A and 3B, the diaphragm 130 may be configured between an open configuration position and a closed configuration position based at least in part on the second fluid channel pressure. In particular, FIG. 3A and FIG. 3B illustrate cross-sectional views of an exemplary passive pressure swing valve 100 configured in a closed valve configuration and an open valve configuration, respectively. As described herein, the diaphragm 130 being arranged in an open configuration position may correspond to the valve 100 being in an open configuration, while the diaphragm 130 being arranged in a closed configuration position may correspond to the valve 100 being in a closed configuration. In various embodiments, a pressure differential between a second fluid channel pressure in the second fluid channel 120 and a first fluid channel pressure in the first fluid channel 110 may cause the diaphragm to be configured in an open or a closed configuration position. For example, in an exemplary circumstance wherein the second fluid channel pressure (e.g., the pilot pressure) is greater than the first fluid channel pressure within the first fluid channel 110, the pushing force applied against the diaphragm 130 by the second fluid channel pressure may be greater than that applied against the diaphragm 130 in the opposite direction by the first fluid channel pressure. In such an exemplary circumstance, the second fluid channel pressure being greater in magnitude than the fluid channel pressure may cause the diaphragm 130 to be moved to, and/or remain in, a closed configuration position. Conversely, in an exemplary circumstance wherein the first fluid channel pressure is greater than the second fluid channel pressure, the valve 100 may be configured such that the diaphragm 130 may move to, and/or remain in, an open configuration position, such that a volume of fluid received by the valve 100 at the first fluid channel inlet 111 may flow continuously along a fluid flow path to the first fluid channel outlet 112, as described herein.

In various embodiments, the valve 100 may comprise a seal system configured to apply one or more forces to the diaphragm 130 such that the diaphragm 130 may be predisposed to being arranged in a closed configuration position. For example, a seal system of the valve 100 may define a threshold force that may be applied to the diaphragm 130 to move the diaphragm 130 from a closed configuration position to an open configuration position. In an exemplary circumstance described herein, the seal system of the valve 100 may be configured such that the diaphragm 130 may remain in a closed configuration position until a pressure differential within the valve 100 is sufficiently high (e.g., reaches a threshold value) so as to force the diaphragm 130 to move from the closed configuration position to the open configuration position. As a non-limiting example, such a condition may be present within the valve 100 in a circumstance wherein the force of the first fluid channel pressure is greater than the sum of the second fluid channel pressure force and the force(s) generated by the seal system that are acting on the diaphragm 130.

In various embodiments, for example, the seal system of the valve 100 may comprise a plurality of magnets configured to utilize the various forces associated with the attraction and/or repulsion between oppositely charged magnets of the plurality in order to at least partially control the positioning of the diaphragm 130 under various pressure conditions within the valve 100. As illustrated in FIG. 1, the valve 100 may comprise a plurality of magnets 113, 123 including at least one magnet arranged on opposite sides of the diaphragm 130. For example, the seal system of the valve 100 may comprise a static magnet 113 arranged on a first side of the diaphragm 130 at least substantially adjacent the first fluid channel 110 and a dynamic magnet 123 arranged on a second side of the diaphragm 130 at least substantially adjacent the second fluid channel 120. In various embodiments, a static magnet 113 may be secured relative to the valve body 101 (e.g., embedded therein) so as to prevent the static magnet 113 from being displaced within the valve 100. Conversely, the dynamic magnet 123 may be configured to move within the valve 100 (e.g., within the second fluid channel 120) in response to one or more forces realized by the magnet 123 or a valve component attached thereto. For example, in various embodiments, the static and dynamic magnets 113, 123 may comprise rare-earth ring magnets. In certain embodiments, it should be understood that the plurality of magnets 113, 123 (shown in FIG. 1) may be simply two or more magnetic components, which may, in turn, comprise two or more (or a plurality of) magnets, two or more (or a plurality of) ferromagnetic materials, combinations thereof, or the like.

As a non-limiting example, the dynamic magnet 123 may be secured relative to a magnet guide rod 122 (e.g., embedded therein) such that any forces realized by the dynamic magnet 123 and/or the guide rod 122, as described herein, may cause the guide rod 122 and the dynamic magnet 123 secured thereto to uniformly and collectively be displaced within the second fluid channel 120 in the diaphragm thickness direction. The static magnet 113 and the dynamic magnet 123 may be configured such that an attractive magnetic force exists therebetween. The valve 100 may be configured such that the magnetic attraction between the static magnet 113 and the dynamic magnet 123 may pull dynamic magnet 123 and attached guide rod 122 toward the static magnet 113, thereby causing a force to be applied to the diaphragm 130 in a direction towards a closed configuration position. For example, the diaphragm 130 may remain in a closed configuration position until the force of the first fluid channel pressure acting on the area of diaphragm 130 within seal 131 is greater than the sum of the force of the second fluid channel pressure acting on the full dynamic area of diaphragm 130 and the magnetic force attracting the dynamic magnet 123 to the static magnet 113. Once the initial amount of the first fluid passes the seal, it immediately applies pressure to the full dynamic area of diaphragm 130, thus greatly magnifying the opening force and pushing diaphragm 130, dynamic magnet 123 with guide rod 122 fully open. This extra assist in fully opening valve 100 helps prevent the valve from quickly closing soon after diaphragm 130 separates from seal 131 and the fluid pressure in 110A momentarily drops. Otherwise, the valve will not fully open and initiate the pressure swing cycle. The undesirable release of only small amounts of fluid and then valve 100 reclosing is exacerbated if the entire sealing surface of diaphragm 130 does not separate uniformly from seal 131. Guide rod 122 keeps the seal face of diaphragm 130 square to seal 131 to ensure that the full seal area separates and moves apart uniformly to maximize the fluid flow and successfully engage the dynamic portion of diaphragm 130 and push the valve fully open. Otherwise, if only a small section if diaphragm 130 disengages from seal 131, the fluid flow is insufficient to act on the dynamic area of diaphragm 130 and valve 100 closes, failing to initiate the pressure swing cycle. In embodiments that use a piston as a mobile separator, a separate guide rod 122 is not required as a sufficiently long piston will in of itself perform the function of guide rod 122

In an exemplary circumstance, the force generated by the magnetic attraction between the static magnet 113 and the dynamic magnet 123 may decrease with the inverse square of the distance as the diaphragm moves from a closed configuration position to an open configuration position and the guide rod 122 (with the dynamic magnet 123 attached thereto) is displaced within the second fluid channel 120. Such an exemplary configuration may facilitate a substantially instantaneous actuation (i.e. a "burst") as the diaphragm 130 initiates a transition from a closed configuration position to an open configuration position. Similarly, in an exemplary circumstance wherein the diaphragm is transitioning from an open configuration position to a closed configuration position, the rapidly increasing attraction force between the magnets 113, 123 may facilitate a substantially instantaneous closing actuation as the diaphragm 130 is approaching the closed configuration position. Further, the greatly decreased attraction force between the magnets 113, 123 may minimize the closing force applied on a diaphragm 130 arranged in an open configuration position such that the transition of the diaphragm 130 towards the closed configuration position may be accurately initiated when the second fluid channel pressure is at least substantially equivalent to that of the first fluid channel pressure. As described herein, the nonlinear nature of the magnetic forces described herein enable the actuation of the valve 100 to exhibit a hysteresis effect wherein the pressure differentials at which the valve 100 is actuated (e.g., initially opened or pulled into a closed configuration as the diaphragm 130 approaches a closed configuration position) is maximized. Such an exemplary configuration may facilitate increased valve precision and accuracy by minimizing undesired pressure variances that occur as the valve is transitioning between open and closed configurations. It should be understood that, although being described as having an inverse square relationship, the force generated by the magnetic attraction between the static magnet 113 and the dynamic magnet 123 may be configured so as to exhibit an exponential relationship and/or any other relationship appropriate for producing the valve actuation functionality described herein.

In various embodiments, the valve 100 may comprise a valve seat 131 arranged adjacent the first fluid channel and configured to engage a surface of the diaphragm 130 when the diaphragm is in a closed configuration position. The valve seat 131 may be configured to create a seal around at least a portion of the surface of the dynamic diaphragm portion so as to define an area at which the force generated by the first fluid channel pressure may act on the diaphragm 130. For example, the first fluid channel pressure that may initiate the actuation of the diaphragm 130 from the closed configuration position to the open configuration position may be defined at least in part by the size of the area within the valve seat 131. Further, in various embodiments, the valve 100 may comprise a ferromagnetic faceplate 124 that is at least substantially secured relative to the dynamic magnet 123 and/or the guide rod 122 and arranged between the guide rod 122 and the diaphragm 130. The faceplate 124 may be configured to engage the diaphragm 130 such that any forces transmitted from the guide rod 122 and/or the dynamic magnet 123 to the diaphragm 130 (or, conversely, from the diaphragm 130 to the guide rod 122 and/or the dynamic magnet 123) may be transmitted through the faceplate 124. For example, the faceplate 124 may be defined at least in part by a surface area configured to interface the diaphragm 130. The surface area of the faceplate 124 may be at least substantially larger than the area of valve seat 131 so as to assure uniform and complete sealing between diaphragm 130 and valve seat 131.

In various embodiments, as illustrated, the valve 100 may further comprise one or more spacer gaskets 132 in various embodiments. The one or more spacer gaskets 132 mat be positioned immediately adjacent both the static diaphragm portion of the diaphragm and the valve body 101 and may be configured to provide spatial clearance for the dynamic diaphragm portion in the thickness direction such that the diaphragm 130 may have an uninterrupted desired range of motion between an open configuration position and a closed configuration position. In various embodiments, the spacer gaskets 132 may be further configured to define at least a portion of the range of motion of the guide rod 122 (and the dynamic magnet 123 secured thereto). For example, the thickness of the one or more spacer gaskets 132 may define the range of motion in the diaphragm thickness direction of the faceplate 124, and thus, the distance between the closed configuration position and the open configuration position of the diaphragm 130. Accordingly, in such an exemplary circumstance, the thickness of the one or more spacer gaskets 132 may at least partially define the magnitude of the force sufficient to displace the diaphragm 130 from an open configuration position to a closed configuration position. As a non-limiting example, in various embodiments, the spacer gasket thickness may be at least substantially between 0.1 mm and 10 mm (e.g., between 1 mm and 3 mm). Further, in various embodiments, the spacer gaskets 132 may be configured to facilitate a desired spacing configuration by extending one or more seal areas of valve body 101 based at least in part on a commensurate thicknesses so as to seal directly against a portion of the diaphragm 130.

System

Various embodiments described herein are directed to a passive pressure swing system for fuel cell reactant recirculation. In various embodiments, a passive pressure swing system as described herein may comprise a fuel cell configured to receive one or more volumes of reactant fluid (e.g., gas) at each of an anode and cathode and operate such that a byproduct volume of water is generated within the fuel cell. For example, in various embodiments, the system may be configured such that a volume of hydrogen may be supplied to a fuel cell anode and a volume of oxygen may be supplied to a fuel cell cathode, wherein the fuel cell stacks within the system embody a dead-ended configuration. In such an exemplary circumstance, the passive pressure swing system may comprise an at least substantially closed loop system such that the respective volumes of hydrogen and oxygen introduced into the system are not released into the ambient environment. As described herein, the exemplary passive pressure swing system may be configured to minimize system inefficiencies by utilizing a pressure swing in a reactant supply to instill reactant recirculation to remove the operational byproduct volume(s) of water accumulated within the fuel cell. In various embodiments, the passive pressure swing system may comprise a passive pressure swing valve, as described herein, and may be configured to facilitate the operation of the fuel cell and the byproduct water management through reactant recirculation within the passive pressure swing system. Further, an exemplary passive pressure swing system, as described herein, may be defined by a passive configuration, wherein the system is configured to operate, such as, for example, by executing a plurality of pressure swings via either a bi-directional or uni-directional flow configuration, to enable a recirculation system that does not require electrical power or other external energy input. Further still, the exemplary passive pressure swing system described herein is configured to enable a perpetual operation cycle, wherein the system may be defined by a self-sustaining configuration that is not dependent on external energy input-such as, for example, electrical power-such that the system may at least substantially continuously execute serial pressure swings in order to operate for an at least substantially perpetual and/or indefinite amount of time without requiring any user interaction or input.

Figure 4:
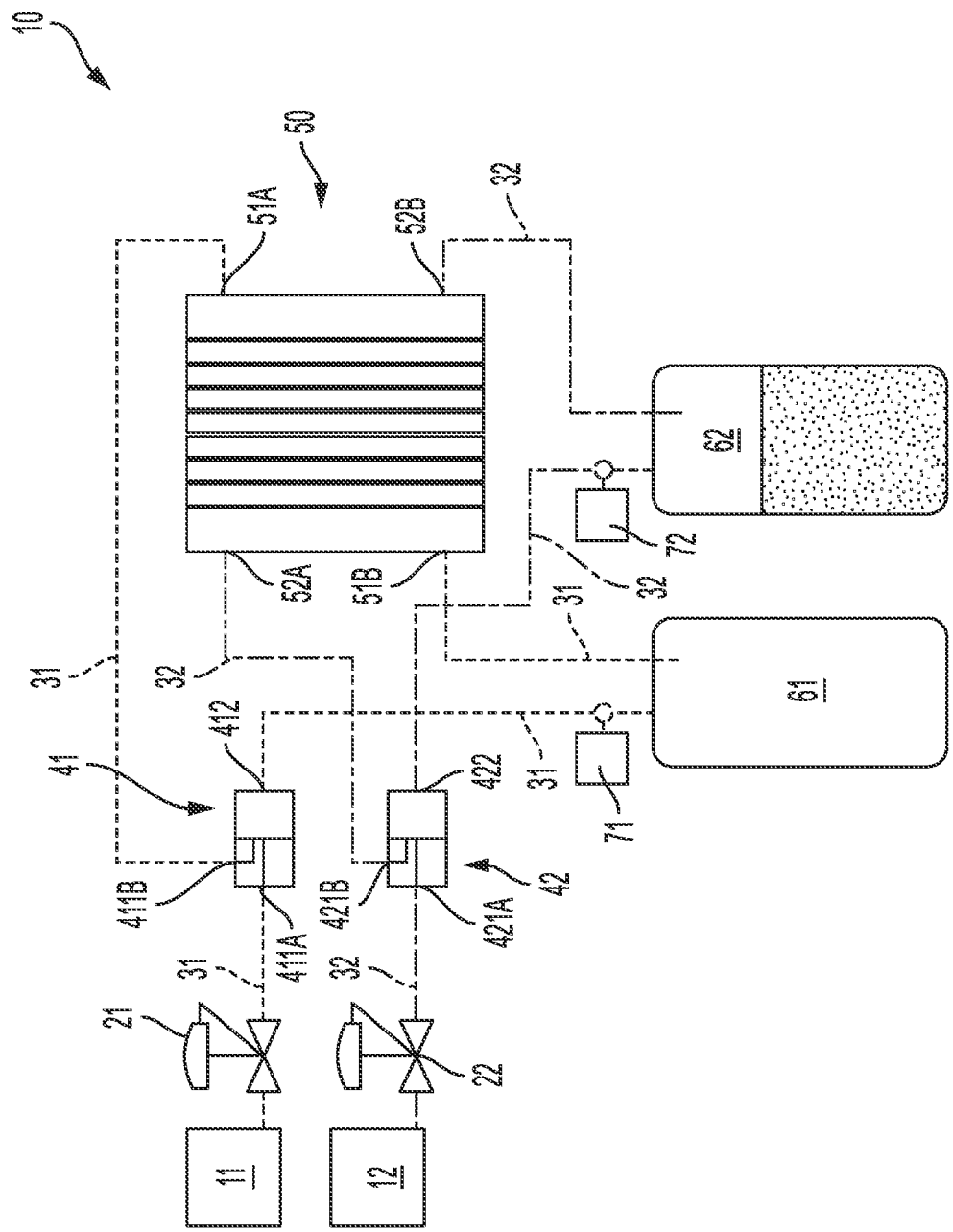
FIG. 4 illustrates a schematic view of an exemplary passive pressure swing system for fuel cell recirculation according to various embodiments.

As an illustrative example, FIG. 4 illustrates an exemplary passive pressure swing fuel cell system according to various embodiments. In particular, the exemplary system 10 comprises two dead-ended reactant fluids (e.g., gases) supplied to fuel cell stacks, each comprising a passive pressure swing valve configured to facilitate the passive pressure swing system for reactant recirculation and byproduct water management. As illustrated, in various embodiments, the system 10 may comprise a first reactant supply 11 configured to supply a volume of a first reactant fluid to the system 10. Further, in various embodiments, the system 10 may comprise a second reactant supply 12 configured to supply a volume of a second reactant fluid to the system 10. The system 10 may be configured to transmit the volume of the first reactant fluid and the volume of the second reactant fluid to a fuel cell 50 through a first reactant conduit 31 and a second reactant conduit 32, respectively. In various embodiments, the first and second reactant conduits 31, 32 may be configured to direct the flow of the respective reactant fluids throughout the system 10 (e.g., between the various components thereof) so as to respectively define at least a portion of a first fluid flow path and a second fluid flow path. For example, in various embodiments, the first reactant conduit 31 may be fluidly connected to an anode of the fuel cell 50 such that the anode of the fuel cell 50 may receive a volume of the first reactant fluid. Further, in various embodiments, the second reactant conduit 32 may be fluidly connected to a cathode of the fuel cell 50 such that the cathode of the fuel cell 50 may receive a volume of the second reactant fluid. As non-limiting exemplary configuration, the first reactant fluid may comprise hydrogen ($H_2$) and the second reactant fluid may comprise oxygen ($O_2$).

In various embodiments, the system 10 may comprise a pressure regulator configured to regulate the pressure at which a volume of reactant fluid dispensed from a reactant supply, such that the volume of reactant fluid is introduced into the system 10 at a predetermined pressure. For example, the system 10 may include a first pressure regulator 21 corresponding to the first reactant supply 11 and a second pressure regulator 22 corresponding to the second reactant supply 12, wherein each of the pressure regulators 11,12 is arranged at least substantially directly downstream from the corresponding reactant supply.

In various embodiments, the system 10 may comprise at least one passive pressure swing valve configured to facilitate the operation of the passive pressure swing system, as described herein. As illustrated, the system 10 may comprise a first passive pressure swing valve 41 and a second passive pressure swing valve 42 arranged in-line with the first reactant conduit 31 and the second reactant conduit 32, respectively. As described herein, the first passive pressure swing valve 41 may be arranged along the first fluid flow path in between the first reactant supply 11 and the fuel cell 50 so as to be fluidly connected to both the first reactant supply 11 and the anode of the fuel cell 50. Similarly, the second passive pressure swing valve 42 may be arranged along the second fluid flow path in between the second reactant supply 12 and the fuel cell 50 so as to be fluidly connected to both the second reactant supply 12 and the cathode of the fuel cell 50. For example, the first passive pressure swing valve 41 may be configured to receive a volume of first reactant fluid (e.g., hydrogen) from the first reactant supply 11 at a first valve fluid channel inlet 411A via the first reactant conduit 31. Further, the second passive pressure swing valve 42 may be configured to receive a volume of a second reactant fluid (e.g., oxygen) from the second reactant supply 12 at a first valve fluid channel inlet 421A via the second reactant conduit 32.

As described further herein, each of the passive pressure swing valves 41, 42 may comprise both a first valve fluid channel and a second valve fluid channel valve and may be configurable between an open configuration and a closed configuration based at least in part on a pressure differential between the pressure within the first valve fluid channel (e.g., a first valve fluid channel pressure) and the pressure within the second valve fluid channel (e.g., a second valve fluid channel pressure). For example, in various embodiments wherein the first passive pressure swing valve 41 embodies an open configuration, a volume of first reactant fluid received from the first reactant supply 11 may travel continuously through the first valve fluid channel of the valve 41 from the inlet 411A to an outlet 411B. Conversely, in various embodiments wherein the first passive pressure swing valve 41 embodies a closed configuration, the reactant flow within the first valve fluid channel may be impeded between the inlet 411A and the outlet 411B so as to prevent the volume of first reactant fluid received from the first reactant supply 11 from flowing through the valve 41 to the fuel cell 50. In various embodiments, the system 10 may be configured such that the first valve fluid channel pressure within the first passive pressure swing valve 41 may correspond to the configuration of the first pressure regulator 21 positioned upstream therefrom such that the first valve fluid channel pressure is at least substantially similar to that of the reactant flowing through the first pressure regulator 21.

In various embodiments wherein the second passive pressure swing valve 42 embodies an open configuration, a volume of second reactant fluid received from the second reactant supply 12 may travel continuously through the first valve fluid channel of the valve 42 from the inlet the first fluid channel inlet 421A to the first fluid channel outlet 421B, as described herein. Conversely, in various embodiments wherein the second passive pressure swing valve 42 embodies a closed configuration, the reactant flow within the first valve fluid channel of the second passive pressure swing valve 42 may be at least substantially interrupted between the inlet 421A and the outlet 421B so as to prevent the volume of second reactant fluid received from the second reactant supply 12 from flowing through the valve 42 to the fuel cell 50. In various embodiments, the system 10 may be configured such that the first valve fluid channel pressure within the second passive pressure swing valve 42 may correspond to the configuration of the second pressure regulator 22 positioned upstream therefrom, such that said first valve fluid channel pressure is at least substantially similar to that of the reactant flowing through the second pressure regulator 22.

In various embodiments, as described herein, the exemplary system 10 may be configured to transmit a volume of the first reactant fluid and a volume of the second reactant fluid to the fuel cell 50 through a first reactant conduit 31 and a second reactant conduit 32, respectively. For example, as illustrated, the system 10 may be configured such that the fuel cell 50 may receive a volume of first reactant fluid (e.g., hydrogen) flowing from the open-configuration first passive pressure swing valve 41 at an anode stack inlet 51A that is fluidly connected with the first reactant conduit 31. In various embodiments, the fuel cell 50 may be configured such that a volume of first reactant fluid received at the anode stack inlet 51A may flow continuously through the fuel cell 50 along a fluid flow path to the anode stack outlet 51B. The reactant fluid flow path extending within the fuel cell 50 between the anode stack inlet 51A and the anode stack outlet 51B may define an anode stack fluid flow path. As described herein, the anode stack outlet 51B may be fluidly connected with a portion of the first reactant conduit 31 such that, in an exemplary circumstance wherein a volume of first reactant fluid is travelling through the fuel cell 50 along the anode stack fluid flow path in a first flow direction (e.g., from the anode stack inlet 51A to the anode stack outlet 51B), the volume of first reactant fluid may be dispensed from the fuel cell 50 to an adjacent portion of the first reactant conduit 31 via the anode stack outlet 51B.

Further, as described herein, in various embodiments, the system 10 may be further configured such that the fuel cell 50 may receive a volume of second reactant fluid (e.g., oxygen) flowing from the open-configuration second passive pressure swing valve 42 at a cathode stack inlet 52A that is fluidly connected with the second fluid conduit 32. The fuel cell 50 may be configured such that a volume of second reactant fluid received at the cathode stack inlet 52A may flow continuously through the fuel cell 50 along a fluid flow path to the cathode stack outlet 52B. The reactant fluid flow path extending within the fuel cell 50 between the cathode stack inlet 52A and the cathode stack outlet 52B may define a cathode stack fluid flow path. As described herein, the cathode stack outlet 52B may be fluidly connected with a portion of the second reactant conduit 32 such that, in an exemplary circumstance wherein a volume of second reactant fluid is travelling through the fuel cell 50 along the cathode stack fluid flow path in a first flow direction (e.g., from the cathode stack inlet 52A to the cathode stack outlet 52B), the volume of second reactant fluid may be dispensed from the fuel cell 50 to an adjacent portion of the second reactant conduit 32 via the cathode stack outlet 52B.

In various embodiments, the exemplary system 10 may comprise a plurality of reservoirs, each reservoir of the plurality being in fluid communication with a respective fluid flow path of the fuel cell 50. In various embodiments, a reservoir as described herein may comprise a container such as, for example, a vessel, a tank, and/or the like, arranged in-line with a fluid flow path of an exemplary system and configured to receive and at least temporarily retain therein one or more volumes of fluid (e.g., a volume of reactant fluid, a volume of byproduct water) travelling along the corresponding fluid flow path, as described herein. For example, the exemplary system 10 may comprise a first reservoir 61 and a second reservoir 62 arranged in-line with the first reactant conduit 31 (e.g., the first fluid flow path) and the second reactant conduit 32 (e.g., the second fluid flow path), respectively. The first reservoir 61 may be fluidly connected to the anode stack outlet 51B such that the first reservoir 61 may be configured to receive a volume of first reactant fluid (e.g., hydrogen) and/or a volume of byproduct water (e.g., displaced from the fuel cell 50 by the volume of first reactant fluid flowing through the anode stack fluid flow path) dispensed from the anode stack outlet 51B and traveling along the first reactant conduit 31 in a first flow direction. Similarly, as described herein, the second reservoir 62 may be fluidly connected to the cathode stack outlet 52B such that the second reservoir 62 may be configured to receive a volume of second reactant fluid (e.g., oxygen) and/or a volume of byproduct water (e.g., displaced from the fuel cell 50 by the volume of second reactant fluid flowing through the cathode stack fluid flow path) dispensed from the cathode stack outlet 52B and traveling along the second reactant conduit 32 in a first flow direction.

In various embodiments, each reservoir in the exemplary system 10 may be defined at least in part by a reservoir volume, which may be defined as the internal volumetric capacity of the reservoir and may correspond to the amount of fluid (e.g., reactant fluid and/or byproduct water) that may be housed within the reservoir. For example, the first reservoir 61 may be defined at least in part by a first reservoir volume. As described herein, in an exemplary circumstance, at least a portion of the first reservoir 61 (e.g., the first reservoir volume) may be filled with a volume of first reactant fluid and/or a volume of byproduct water dispensed from the anode stack outlet 51B. As a non-limiting example, in various embodiments, a first portion of the first reservoir volume may be occupied by a volume of hydrogen gas and a second portion of the first reservoir volume may be occupied by a volume of byproduct water. In various embodiments, the second reservoir 62 may be defined at least in part by a second reservoir volume. As described herein, in an exemplary circumstance, at least a portion of the second reservoir 62 (e.g., the second reservoir volume) may be filled with a volume of second reactant fluid and/or a volume of byproduct water dispensed from the cathode stack outlet 52B. As a non-limiting example, in various embodiments, a first portion of the second reservoir volume may be occupied by a volume of oxygen gas and a second portion of the second reservoir volume may be occupied by a volume of byproduct water. In various embodiments, the reservoirs may be large enough to contain the product water for operation of the fuel cell for a desired length of time, plus a reserve volume sufficient for pressure swing recirculation as the reservoir approaches its full byproduct water capacity. Further, in various embodiments, the product water can be selectively released from the reservoir using one or more release methods, such as, for example, with a passive mechanism such as a float valve. In such an exemplary circumstance, the reservoir volume is independent of the desired length of operation and the reserve volume sufficient for pressure swing operation can be much closer to the total reservoir volume. In these various embodiments, the reserve reservoir volume of an exemplary reservoir may be at least substantially between 0.001 L and 1,000 L (between 0.01 L and 10 L).

In various embodiments, one or more local reservoir conditions of an exemplary reservoir, such as, for example, a pressure within the reservoir, may be affected at least in part, by the reservoir volume thereof. For example, the first reservoir 61 of the system 10 may be defined, at least in part, by a first reservoir volume. In an exemplary circumstance wherein the first reservoir 61 is at least substantially rigid such that the first reservoir volume is constant, the flow in and out of the first reservoir 61 (e.g., the first reservoir volume available for pressure swing) may correspond to the collective amount (e.g., volume) of first reactant fluid and byproduct water present within the first reservoir at a given instance. As described herein, the first reservoir pressure-swing volume may vary as the first reservoir 61 receives additional byproduct water from the fuel cell 50 and/or as one or more volumes of first reactant fluid flow into and/or out of the first reservoir 61 (e.g., based on one or more pressure characteristics within the system 10 along the first fluid flow path, as described herein). Although described above with respect to an exemplary first reservoir pressure within the first reservoir 61, the second reservoir 62, as illustrated in FIG. 4, may similarly experience a variable flow volume (e.g., a second reservoir variation in volume available pressure swing) that may be defined at least in part by the second reservoir volume and may fluctuate in a given circumstance based at least in part on a change in the amount of fluid present within the second reservoir. As described herein, the second reservoir pressure-swing volume may vary as the second reservoir 62 receives additional byproduct water from the fuel cell 50 (e.g., via the cathode stack outlet 52B) and/or as one or more volumes of second reactant fluid flow into and/or out of the second reservoir 62 (e.g., based on one or more pressure characteristics within the system 10 along the second fluid flow path, as described herein). In various embodiments, the system 10 may comprise a plurality of pressure gauges 71, 72, each pressure gauge 71, 72 being configured to measure the reservoir pressure of a respective reservoir fluidly connected therewith. For example, the system 10 may comprise a first pressure gauge 71 arranged to measure the pressure within the first reservoir 61, and a second pressure gauge 72 arranged to measure the pressure within the second reservoir 62. As illustrated in FIG. 4, the exemplary pressure gauges 71, 72 may be located on the pilot sides of lines 31 and 32 relative to a respective reservoir (e.g., between the respective reservoir and the respective valve) based at least in part on a configuration wherein flowrates through the respective pilot lines are relatively low and the pilot pressures are at least substantially similar to the respective reservoir pressures.

In various embodiments, an exemplary reservoir may be arranged along a respective fluid flow path in between an outlet of the fuel cell 50 (e.g., anode stack outlet 51B, cathode stack outlet 52B) and a second fluid channel of a respective passive pressure swing valve. For example, As illustrated in FIG. 4, at least a portion of a first reactant conduit 31 may extend between the first reservoir 61 and the first passive pressure swing valve 41. In particular, the first reservoir 61 may be fluidly connected to a second fluid channel 412 of the first passive pressure swing valve 41. In such an exemplary configuration, the system 10 may be configured such that a volume of first reactant fluid may flow from the first reservoir 61 along the first fluid flow path in a first flow direction to the second fluid channel 412 of the first passive pressure swing valve 41. Similarly, as illustrated, the system 10 may be configured such that a volume of second reactant fluid may flow from the second reservoir 62 along the second fluid flow path in a first flow direction to the second fluid channel 422 of the second passive pressure swing valve 42.

In various embodiments, an exemplary system 10 may be configured such that the second fluid channels 412, 422 of the first passive pressure swing valve 41 and the second passive pressure swing valve 42 may each define a fluid end of the corresponding first fluid flow path along which the valve is arranged. In such an exemplary configuration, as described herein, the first fluid flow path and the second fluid flow path of the system 10—corresponding to the fuel cell stack anode and the fuel cell stack cathode, respectively—may each comprise a dead-end configuration. Accordingly, in an exemplary circumstance wherein the first passive pressure swing valve 41 is configured in an open configuration such that the first reactant supply 11 may provide an at least substantially continuous volume of first reactant fluid to the fuel cell 50 (e.g., to the anode stack inlet 51A), at least a portion of a volume of first reactant fluid may be dispensed by the fuel cell 50 and flow in a first flow direction along the first fluid flow path to the second fluid channel 412 of the first passive pressure swing valve 41. In various embodiments, the second fluid channel 412 of the first passive pressure swing valve 41 may be defined in part by a second fluid channel volume and may exhibit a first valve pilot pressure. The first valve pilot pressure may comprise the pressure within the second fluid channel 412 and/or at a portion of the first reactant conduit 31 positioned at least substantially adjacent thereto that generates a pressure force that acts on the diaphragm of the first passive pressure swing valve 41, as described in further detail herein. In various embodiments, the first valve pilot pressure may vary based at least in part on the amount of first reactant fluid and/or byproduct water present within the first fluid flow path of the system 10. For example, in various embodiments, the system 10 may be configured such that the first valve pilot pressure within the second fluid channel 412 of the first passive pressure swing valve 41 may correspond to the first reservoir pressure of the first reservoir 61 fluidly connected thereto, such that, at a given instance, said first valve pilot pressure may be at least substantially similar to the first reservoir pressure. Although described above with respect to an exemplary first valve pilot pressure within the first passive pressure swing valve 41, the system 10 may be further configured such that the second fluid channel 422 of the second passive pressure swing valve 42, as illustrated in FIG. 4, may similarly be defined in part by a second fluid channel volume thereof and may exhibit a second valve pilot pressure. In various embodiments, the second valve pilot pressure may comprise a pressure within the second fluid channel 422 and/or at a portion of the second reactant conduit 32 positioned at least substantially adjacent thereto that generates a pressure force that acts on the diaphragm of the second passive pressure swing valve 42, as described in further detail herein. In various embodiments, the second valve pilot pressure may vary based at least in part on the amount of second reactant fluid and/or byproduct water present within the second fluid flow path of the system 10. For example, in various embodiments, the system 10 may be configured such that the second valve pilot pressure within the second fluid channel 422 of the second passive pressure swing valve 42 may correspond to the second reservoir pressure of the second reservoir 62 fluidly connected thereto, such that, at a given instance, said second valve pilot pressure may be at least substantially similar to the second reservoir pressure.

As described herein, each of the passive pressure swing valves 41, 42 in the exemplary system 10 may be configured to facilitate a reactant recirculation operation within the respective fuel cell stack fluidly connected therewith—the fuel cell stack anode and the fuel cell stack cathode, respectively. By way of non-limiting illustration, in an exemplary circumstance described solely with respect to the first fluid flow path of the exemplary system 10 (e.g., the fluid flow path extending between the first passive pressure swing valve 41 and the fuel cell stack anode of the fuel cell 50 and including the first reservoir 61), the first passive pressure swing valve 41 may be configured in an open configuration, allowing a volume of first reactant fluid provided by the first reactant supply 11 to be delivered to the fuel cell 50 (e.g., along the first fluid flow path in a first flow direction). For example, the first reactant fluid may comprise hydrogen gas. In various embodiments, where the first passive pressure swing valve 41 remains in an open configuration, the volume of hydrogen reactant within the dead-end first fluid flow path may continue to increase. For example, the volume of hydrogen reactant may continue to flow through the fuel cell 50 in a first flow direction, described herein, and to the reservoir. In such an exemplary circumstance, the first valve pilot pressure within the second fluid channel 412 of the first passive pressure swing valve 41 may continue to increase, thereby increasing the pressure force acting on the diaphragm of the valve 41 arranged in the open configuration position. As described herein, the first valve pilot pressure may continue to build until the first valve pilot pressure is sufficiently high such that the corresponding force applied at the diaphragm of the valve 41 may overpower a counteracting force generated by the first valve fluid channel pressure within the first fluid channel of the valve 41 (e.g., a first reactant supply pressure at pressure regulator 21) acting on the diaphragm of the valve 41 to keep the valve 41 in an open configuration. In such an exemplary circumstance, wherein the first valve pilot pressure reaches a threshold value sufficient to, along with any assisting forces generated by, for example, a valve seal system (e.g., magnets), as described herein, overcome the first reactant supply pressure within the valve 41, the valve 41 may be actuated such that the valve 41 may transition from an open configuration to a closed configuration.

As described herein, the system 10 may be configured such that the valve 41 transitioning from an open configuration to a closed configuration may cause the flow of the first reactant fluid along the first fluid flow path to change from a first flow direction to a second opposite flow direction. For example, in various embodiments, the system 10 may be configured such that a first passive pressure swing valve 41 arranged in a closed configuration may at least substantially isolate the first fluid flow path from the system pressure source (e.g., the first reactant supply 11). In such a configuration, the system pressure at the portion of the first reactant conduit 31 positioned adjacent the first fluid channel outlet 411B of the valve 41 may be at least substantially lower than that the first valve pilot pressure. Accordingly, the flow of the hydrogen along the first fluid flow path between stack 50 and reservoir 61 may reverse such that the volume of hydrogen may travel in a second flow direction opposite from the first flow direction, as described herein. For example, a volume of hydrogen present within the first reservoir 61 may proceed to flow along the first fluid flow path in the second flow direction and may be received by the fuel cell 50 at the anode stack outlet 51B. In various embodiments, said volume of hydrogen received by the fuel cell 50 at the anode stack 51B may flow through the fuel cell 50 toward the anode stack inlet 51A. For example, the fuel cell 50 may utilize at least a portion of a volume of hydrogen received from the first reservoir 61 to maintain operation thereof, for example, by producing power. In various embodiments, the exemplary system 10 may be configured such that, as the first passive pressure swing valve 41 remains in a closed configuration, the hydrogen reactant may continue to flow from the first reservoir 61 and through the fuel cell 50 in the second flow direction. In such an exemplary circumstance, as the first reservoir pressure within the first reservoir 61 may continue to decrease as the volume of hydrogen reactant within the first reservoir 61 decreases, which may cause the first valve pilot pressure within the second fluid channel 412 of the first passive pressure swing valve 41 to similarly decrease. As described herein, the first valve pilot pressure and the corresponding force acting on the diaphragm of the valve 41 to maintain a closed valve configuration may continue to decrease until the first valve pilot pressure is sufficiently low such that the closing force applied to the diaphragm of the valve 41 may be overpowered by the counteracting opening force generated by the first valve fluid channel pressure within the first fluid channel of the valve 41 (e.g., a first reactant supply pressure supplied by the first reactant supply 11). In such an exemplary circumstance, wherein the first valve pilot pressure falls below a threshold value such that the first reactant supply pressure within the valve 41 may overcome the first valve pilot pressure—as well as any assisting forces generated by, for example, a valve seal system (e.g., magnets) the valve 41 may be actuated such that the valve 41 may transition from a closed configuration back to an open configuration. The exemplary system 10 may be configured to repeat the above described passive pressure swing cycle so as to facilitate reactant recirculation through the fuel cell 50.

It should be understood that, although disclosed above using a non-limiting example described with respect to a first passive pressure swing valve 41 and an exemplary hydrogen reactant to be received at the fuel cell stack anode of the fuel cell 50, the system 10 may be further configured to similarly execute the various operations of the exemplary passive pressure swing system described above using the second passive pressure swing valve 42, the second reservoir 62, and an exemplary oxygen reactant flowing along a second fluid flow path corresponding to the fuel cell stack cathode of the fuel cell 50, as described herein.

In various embodiments, the fuel cell 50 of the system 10 may be configured to facilitate one or more electrochemical reactions utilizing at least a portion of a volume of reactant fluid flowing therethrough to maintain an operating state. For example, in various embodiments, a fuel cell 50 (e.g., an fuel cell stack anode, a fuel cell stack cathode) may be configured such that, in an operating state, at least a portion of a volume of reactant fluid (e.g., hydrogen, oxygen) flowing along a fluid flow path therein may be used to execute an electrochemical reaction in order to produce a power output from the fuel cell 50. As described herein, such an electrochemical reaction may generate a volume of byproduct water within the fuel cell 50 along the fluid flow path at which the chemical reaction took place. The fuel cell 50 may be configured such that, as the fuel cell 50 processes one or more volumes of reactant fluid over time, the volume of byproduct water within the corresponding fluid flow path (e.g., the anode stack fluid flow path and/or the cathode stack fluid flow path) may accumulate. For example, as described herein, the exemplary system 10 may be configured to facilitate the bi-directional flow initiated by the passive pressure swing configuration described above. In an exemplary circumstance wherein a passive pressure swing valve 41, 42 is configured in a closed valve configuration, a volume of reactant fluid within the system may travel along a corresponding fluid flow path in a second direction. For example, a valve 41, 42 in a closed valve configuration may cause a volume of reactant fluid present within a reservoir to be dispensed from the reservoir and travel along a fluid flow path in a second direction into the fuel cell 50 through a fuel cell stack outlet (e.g., an anode stack outlet 51B and/or a cathode stack outlet 52B). In such a circumstance, as the volume of reactant fluid flows through the fuel cell 50 in the second direction, the fuel cell 50 may be configured to process at least a portion of the reactant fluid such that a volume of byproduct water may accumulate along the fluid flow path within the fuel cell 50. As described, in various embodiments, the second flow direction, which may correspond to a closed valve configuration and further may be defined by a volume of reactant fluid flowing from the reservoir to the fuel cell 50, may define a portion of the exemplary passive pressure swing cycle exhibited by the system 10 wherein a volume of byproduct water may accumulate within the fuel cell 50.

In various embodiments, in order to avoid the inaccuracies and/or diminished fuel cell 50 performance caused by the accumulation of byproduct water within the fuel cell 50, as described herein, the exemplary system 10 may be configured to remove at least substantially all of the volume of byproduct water present within the fuel cell 50. The system 10 may be configured such that accumulated volumes of byproduct water may be removed from of each of the dead-end anode stack and the dead-end cathode stack and transported to a corresponding reservoir fluidly connected therewith.

In various embodiments, the system 10 may be configured to remove at least substantially all of a volume of byproduct water from within a fuel cell 50 by providing a flow of a volume of reactant fluid through a fluid flow path along which the volume of byproduct water has accumulated within the fuel cell 50 such that the reactant fluid may engage the accumulated byproduct water so as to initiate the flow of the water along the fluid flow path in the direction of the reactant flow. For example, in an exemplary circumstance wherein a passive pressure swing valve 41, 42 is configured in an open valve configuration, a substantially continuous volume of reactant fluid may be supplied to a fluid flow path such that the volume of reactant fluid may travel in first direction from the reactant fluid supply, through the open passive pressure swing valve and to a fuel cell stack inlet (e.g., an anode stack inlet 51A, and/or a cathode stack inlet 52A) of the fuel cell 50. For example, a valve 41, 42 in an open valve configuration may allow the volume of reactant fluid to flow (e.g., at least substantially continuously) through the fuel cell 50 in the first flow direction and subsequently through a fuel cell stack outlet (e.g., an anode stack outlet 51B, and/or a cathode stack outlet 52B) to a reservoir arranged along the fluid flow path. For example, the system 10 may be configured such that the flow of the volume of reactant fluid through the fuel cell 50 in the first direction may be utilized to flush out at least a portion of the accumulated byproduct water from the fuel cell 50 and along the fluid flow path to a downstream reservoir configured to receive, retain, and/or store at least substantially all of one or more volumes of byproduct water removed from the fuel cell 50.

In various embodiments, as described herein, an exemplary system 10 may comprise a plurality of fluid flow paths, such as, for example, a first fluid flow path defined at least in part by a first passive pressure swing valve 41, a first reactant conduit 31 and an anode fluid flow path within the fuel cell 50, and a second fluid flow path defined at least in part by a second passive pressure swing valve 42, a second reactant conduit 32 and a cathode fluid flow path within the fuel cell 50, each fluid flow path being configured to direct the bi-directional flow of a respective reactant fluid throughout the system 10, as described herein. In various embodiments, at least a portion of each fluid flow path may be defined at least in part by a dead volume comprising a volumetric capacity of the fluid flow path (excluding the volume of reservoir arranged in-line therewith), such as, for example, the volume of the anode fluid flow path or the cathode fluid flow path within a fuel cell 50. In various embodiments, the exemplary system 10 described herein may be configured such that the dead volume of an exemplary fluid flow path may be at least substantially less than the reservoir volume of a reservoir arranged in-line therewith, so as to ensure that the reservoir volume is sufficiently large such that the reservoir is physically capable of receiving and retaining at least substantially all of a volume of byproduct water accumulated along the fluid flow path (e.g., within the fuel cell 50). For example, in various embodiments, the dead volume of a fluid flow path may be at least substantially between 0.001 L and 1000 L (between 0.01 L and 10 L). Further, as described herein, in various embodiments, the reservoir volume of an exemplary reservoir may be at least substantially between 0.001 L and 10000 L (between 0.01 L and 10 L).

Alternatively, or additionally, in various embodiments, the system 10 may be configured to ensure that at least substantially all of a volume of byproduct water accumulated within a fuel cell 50 (e.g., within an anode fluid flow path and/or a cathode fluid flow path) is flushed out from within the fuel cell 50 based at least in part on the magnitude of the pressure swing realized within the system 10 when a passive pressure swing valve therein is configured in a closed configuration. In various embodiments, a pressure swing realized by the system 10 may be defined at least in part by a change in reservoir pressure at a reservoir during a period of time in which a passive pressure swing valve fluidly connected therewith is in a closed valve configuration. For example, the exemplary system described herein 10 may be configured based at least in part according to the equation included below, wherein $\Delta P$ represents the pressure swing exhibited by the system, $V_{Reservoir}$ represents the pressure swing volume of the reservoir, $P_{average}$ represents the average pressure of the reservoir, and $V_{Fuel\ Cell\ Stack}$ represents the dead volume within a fuel cell stack fluid flow path:

$$\Delta P * V_{Reservoir} > P_{ave} * V_{Fuel\ Cell\ Stack}$$

Here, the first term effectively represents the quantity of gas that flows completely through the stack with each pressure cycle, and the second term represents the average quantity of gas within the stack. As such, for bi-directional pressure swing flow, the equation indicates that ideally the amount of flow completely through the stack exceeds the dead volume of the stack to completely flush out the volume every pressure swing cycle. Otherwise, water may accumulate to an extent that hinders reactant access. As water is collected in the reservoir, the pressure swing volume, $V_{Reservoir}$, decreases, consequently the equation is preferably satisfied at the conclusion of the intended runtime. Perpetual operation requires the removal of water from the reservoir, such as by a float valve, to maintain an effective $V_{Reservoir}$.

In various embodiments, the system 10 and each of the various components there, such as a reactant fluid supply, a passive pressure swing system, a reservoir, a fuel cell, and the like, may be configured such that the bi-directional passive pressure swing cycle utilized to execute the described reactant recirculation operation may function so as to facilitate the removal of at least substantially all of an accumulated volume of byproduct water from within a fuel cell stack.

Figure 5:
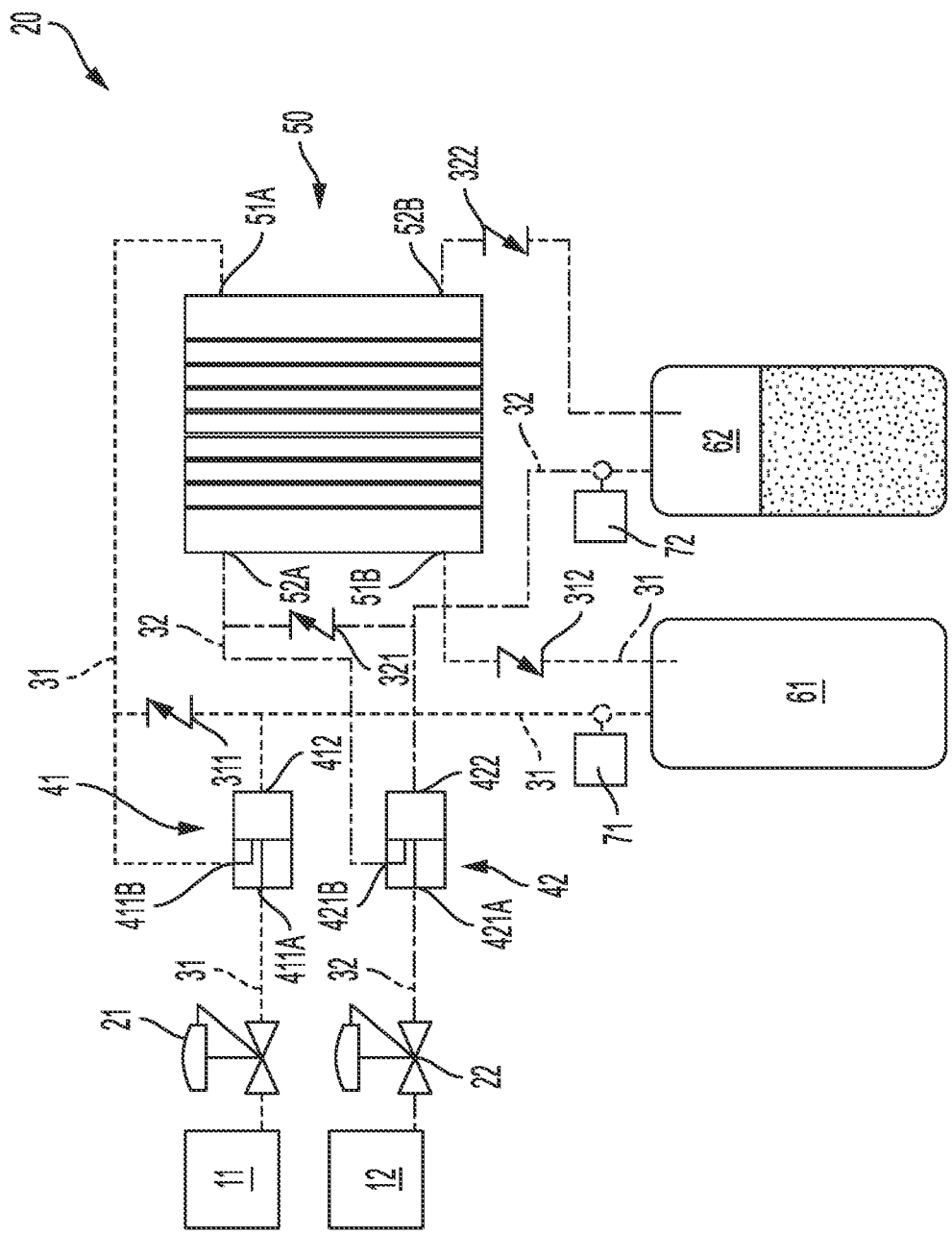
FIG. 5 illustrates a schematic view of an exemplary passive pressure swing system for fuel cell recirculation according to various embodiments.

Further, in various embodiments, the passive pressure swing system described herein may be configured to facilitate a uni-directional swing flow through each of the respective fluid flow lines. For example, in an exemplary circumstance wherein the equation described above may not be satisfied, the system 10 described herein may be adapted to comprise a uni-directional configuration. As a non-limiting example provided for illustrative purposes, FIG. 5 illustrates an exemplary passive pressure swing fuel cell system 20 comprising a uni-directional configuration according to various embodiments described herein. For example, a passive pressure swing system configured for a uni-directional swing flow, such as, for example, the exemplary uni-directional system 20, may be utilized in various embodiments wherein a dead volume of an exemplary fuel cell stack is sufficiently large such that the system is not capable of providing a space (e.g., volume) sufficient to accommodate proportionately large reservoirs. As non-limiting examples provided for illustrative purposes, such an exemplary embodiment may be represented in fuel cell vehicles, drones, various other mobile application, and/or the like.

As illustrated in FIG. 5, the exemplary passive pressure swing fuel cell system 20 comprising a unidirectional configuration may be defined by at least substantially the same components utilized in various exemplary bi-directional configurations described herein. However, in various embodiments, the passive pressure system 20 configured for uni-directional flow through each of the respective fluid conduits 31, 32 may comprise one or more check valves arranged in-line with the fluid conduit so as to direct a flow passing therethrough. For example, passive pressure system 20 may comprise a first plurality of check valves 311, 312 arranged in-line with the first fluid conduit 31 so as to direct the flow through one or more portions of the first conduit 31. Similarly, the passive pressure system 20 may comprise a second plurality of check valves 321, 322 arranged in-line with the second fluid conduit 32 so as to direct the flow through one or more portions of the second conduit 32. In various embodiments, one or more check valves of a passive pressure swing fuel cell system 20 comprising a unidirectional configuration may be configured to direct one or more volumes of flow so that an initial surge from a fluidly connected passive pressure swing valve (e.g., first passive pressure swing valve 41, second passive pressure swing valve 42) and a subsequent supply from a corresponding reservoir may each be directed towards the same stack port, such that said stack port may at least substantially perpetually define the fluid inlet of that stack, irrespective of one or more pressure swings. Further, an exemplary check valve 311, 312, 321, 322 may assure that a reactant leaving a particular stack during the aforementioned surge may always leave through the same stack outlet. Such an exemplary configuration may at least substantially minimize the volumetric capacity required of a reservoir 61, 62 in order for a passive pressure swing fuel cell system 20 defining a unidirectional configuration to remain operable.

Experimental testing was conducted to optimize and verify the effectiveness of embodiments as described herein. Data was collected over the course of multiple trials using various combinations of embodiments described above. The following describes an exemplary experiment conducted using various non-limiting, exemplary embodiments of a system and corresponding components described herein.

For example, an exemplary testing configuration was configured to utilize two reactants-ultra-high purity (UHP) oxygen and hydrogen—to facilitate a bi-directional passive pressure swing configuration, as described herein. In the testing configuration, an exemplary fuel cell stack comprising an 8-cell low dead-volume SuperCell stack (SC181206) was used to provide power to a DC/DC converter comprising a TPS63060 DC/DC converter. The exemplary converter was in turn used to supply 5 W at 5V to an electronic load. In various embodiments, for example, in order to account for inefficiencies in the exemplary system converter, the exemplary fuel cell stack was used to produce at least approximately between 5.5 W and 6 W. The exemplary experimental test configuration comprised two 85 cc vessels used as respective reservoirs for each stack. For example, such a reservoir was large enough to collect 24 h of 5 W byproduct water and leave sufficient free space for an adequate pressure swing volume. As further described herein, the exemplary testing configuration exhibited a bi-directional flow scheme. Pressure transducers (PT) were positioned to measure the pressure within each of the two reservoirs. Individual cell voltages and stack current were also monitored over the course of an experimental run that lasted approximately 25,600 seconds (7.1 hours). The reactant pressure regulators supplying the experimental testing configuration were set at 15 psig for hydrogen and 20 psig for oxygen.

Figure 6:
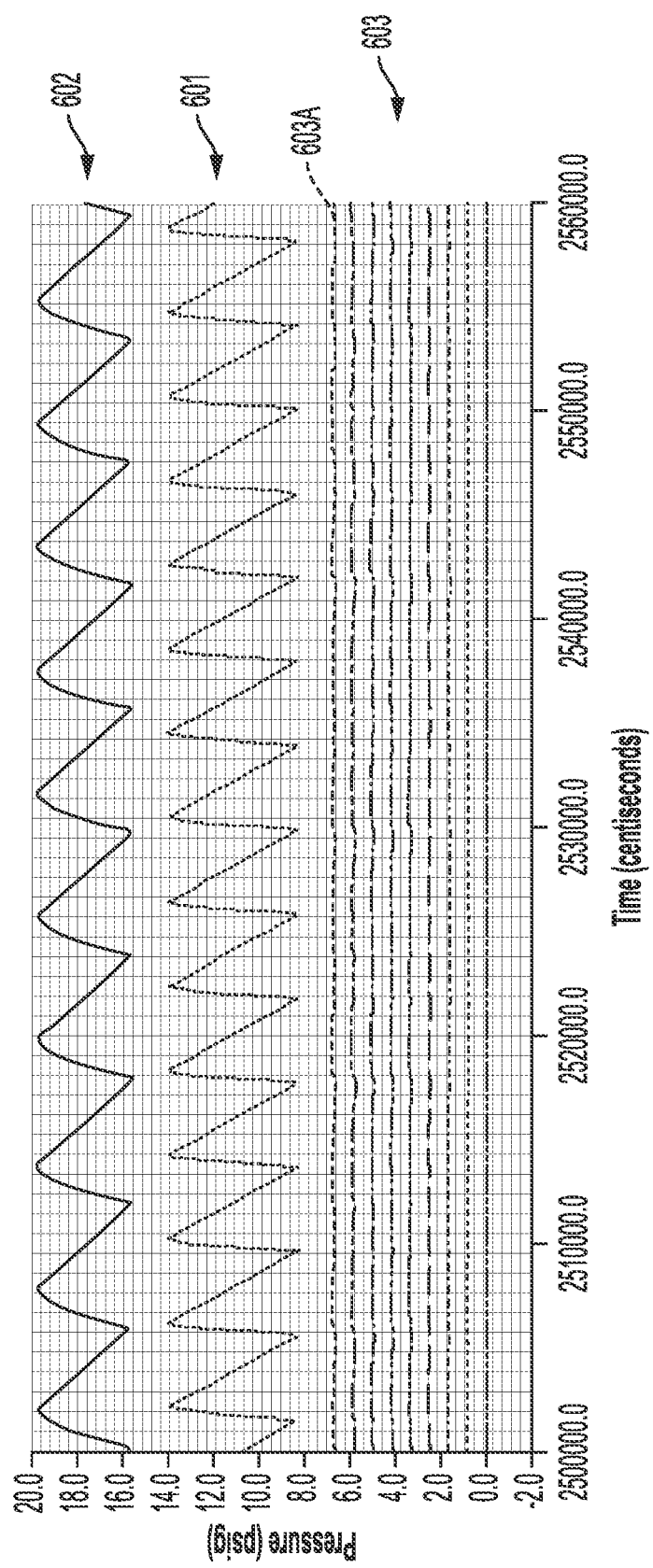
FIG. 6 shows an exemplary graphical representation of signals produced by a testing configuration in accordance with various embodiments.

FIG. 6 shows a graphical representation of various measured output signals over a period of time defined by the last ten (10) oxygen pressure swings of the experimental run. As illustrated, the experimental results show both an anode reservoir pressure signal 601 and a cathode reservoir pressure signal 602, corresponding to the real-time pressure measured at the anode reservoir and the cathode reservoir, respectively. The experimental results illustrated in FIG. 6 further include a stack voltage output signal 603 A corresponding to the voltage produced by the exemplary fuel cell stack, as well as a plurality of output signals 603 each corresponding to a respective individual cell in the stack of the exemplary test configuration.

As shown, when the corresponding reactant was supplied to the anode stack of the exemplary bi-directional testing configuration at a pressure of least substantially between 15 psig and 20 psig, the exemplary anode reservoir pressure signal 601 shows a pressure within the anode reservoir that swung from at least substantially 8.5 psig to approximately 14 psig throughout a single passive pressure swing cycle. The period of anode pressure swings exhibited by the exemplary testing configuration was at least approximately 40 seconds. Further, as illustrated, when the corresponding reactant was supplied to the cathode stack of the exemplary bi-directional testing configuration at a pressure of least substantially between 15 psig and 20 psig, the cathode reservoir pressure signal 602 shows a pressure within the exemplary cathode reservoir that swung from at least substantially 16 psig to approximately 20 psig throughout a single passive pressure swing cycle. The period of cathode pressure swings exhibited by the exemplary testing configuration was at least approximately 60 seconds, notably faster than the initial period at the start of the run (not shown) due to the decrease in accessible pressure swing volume as the reservoir filed with product water, as the vast majority of the product water is collected in the cathode reservoir. As a non-limiting example, in a similar exemplary testing configuration utilized in experimental run that lasted approximately 9.0 hours, 0.27 g and 19.79 g of water were collected in the anode and cathode reservoirs, respectively, for a total water production of 20.06 g of water. Thus over 98% of the product water was collected at the cathode. In an optimized system, the anode reservoir can be substantially smaller than the cathode.

In FIG. 6, the oscillations in the stack 603A and cell 603 voltages are in response to the 601 and 602 reactant pressure swings. Notably, the largest drops occur when the minimums of 601 and 602 coincide. This is due to the ever-increasing accumulation of inerts within the reactant supply gases building up in the reservoirs as the run time increases. When the pressure swing is in the mode whereupon the reactant is provided from the reservoir, the built-up inerts compromise fuel cell reactant distribution and thus performance. The effect is most severe when the pressure swings coincide at the down-point where inert concentrations are maximum. With time, the build-up of inerts and the decrease in pressure swing volume $V_{Reservoir}$ can result in individual cells becoming in danger of reversal and damage to the stack, the reason for the termination of the aforementioned 9 h run. Thus, in a further embodiment, additional steps were taken to assure reactant purity and the reactant supply pressure regulators were increased to 20 and 30 psig to further alleviate the effects of inert accumulation, and the operational objective of over 24 h (87 ks) was attained as shown in FIG. 7. In this figure, the hundreds of individual reservoir pressure oscillations of each reactant blend together graphically into continuous bands. After the 87 ks of operation, 0.53 g and 50.84 g of water were collected in the anode and cathode reservoirs, respectively, for a total water production of 51.37 g. The water collected in the 85 cc cathode reservoir decreased the accessible reactant pressure swing volume to approximately 34 cc to no ill effect. The total amount of water collected was about 1% higher than predicted by the total charge generated by the fuel cell stack, a quantity consistent with the extra water generated by reactant cross-over through the fuel cell membranes.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A passive pressure swing system for fuel cell reactant recirculation comprising:
    a fluid flow path;
    a reactant supply configured to dispense a volume of reactant fluid to the fluid flow path;
    a fuel cell configured to receive at least a portion of the volume of reactant fluid from the fluid flow path to an anode or a cathode of the fuel cell;
    a passive pressure swing valve comprising a first fluid channel and a second fluid channel; and
    a reservoir configured to receive a portion of the volume of reactant fluid and a volume of byproduct water displaced from an outlet of the fuel cell;
    wherein:
        the passive pressure swing valve is configurable between the open valve configuration and the closed valve configuration based at least in part on a pressure differential between a first fluid channel pressure and a second fluid channel pressure within the passive pressure swing valve, and
        the first fluid channel is in fluid communication with the second fluid channel.

2. The system of claim 1, wherein passive pressure swing fuel cell reactant recirculation systems are present for both the anode and the cathode.

3. The system of claim 1, wherein the reactant fluid comprises hydrogen supplied to the anode.

4. The system of claim 1, wherein the reactant fluid comprises oxygen supplied to the cathode.

5. The system of claim 1, wherein the system is further configured to remove at least a portion of an accumulated volume of byproduct water from within the fuel cell utilizing at least a portion of the volume reactant fluid.

6. The system of claim 5, wherein the system is further configured to remove at least substantially all of an accumulated volume of byproduct water from within the anode of the fuel cell utilizing at least a portion of the volume reactant fluid.

7. The system of claim 5, wherein the system is further configured to remove at least substantially all of an accumulated volume of byproduct water from within the cathode of the fuel cell utilizing at least a portion of the volume of reactant fluid.

8. The system of claim 1, further comprising a pressure regulator configured to define a reactant fluid pressure of the volume of reactant fluid at an inlet of the passive pressure swing valve.

9. The system of claim 1, further comprising a first forward check valve located between the fuel cell and the reservoir, wherein the fluid flow path further comprises a spur path extending between the reservoir and an inlet of the fuel cell, the spur path comprising a second forward check valve arranged between the reservoir and the fuel cell inlet; wherein the system is configured to facilitate a uni-directional flow of reactant fluid through the fuel cell.

10. A passive pressure swing valve contained within the passive pressure swing system of claim 1, the passive pressure swing valve comprising:
    a valve body;
    a mobile separator arranged at least substantially between the first fluid channel and the second fluid channel; and
    a seal system comprising two or more magnetic components configured to apply one or more forces to the mobile separator;
    wherein the mobile separator is configurable between the open valve configuration and the closed valve configuration.

11. The passive pressure swing valve of claim 10, wherein the mobile separator is a diaphragm.

12. The passive pressure swing valve of claim 10, wherein the mobile separator is a piston.

13. The passive pressure swing valve of claim 10, wherein the passive pressure swing valve is configurable between the open valve configuration and the closed valve configuration based at least in part on positioning of the mobile separator configuration.

14. The passive pressure swing valve of claim 10, wherein one or more forces applied to the mobile separator correspond to one or more of the first fluid channel pressure, the second fluid channel pressure, and a magnetic force, the magnetic force being generated between the two or more magnetic components, wherein the two or more magnetic components comprise either a plurality of magnets, a plurality of ferromagnetic materials, or a combination thereof.

15. The passive pressure swing valve of claim 10, further comprising a guide rod disposed within the second fluid channel, the guide rod being configured to at least partially control the alignment of the mobile separator as it transitions between the closed valve configuration and the open valve configuration.

16. The passive pressure swing valve of claim 10, wherein the passive pressure swing valve is configured such that the mobile separator may define a substantially variable closing force when moving between the open valve configuration and the closed valve configuration.

17. The passive pressure swing valve of claim 16, wherein the substantially variable closing force of the mobile separator is based at least in part on the one or more forces generated by the seal system.

18. The passive pressure swing valve of claim 10, wherein the system operates without external power with the passive pressure swing valve being configured such that the mobile separator does not require electrical power to move either from the open valve configuration to the closed valve configuration position or vice-versa.

19. A passive pressure swing system for fuel cell reactant recirculation comprising:
  a fluid flow path;
  a reactant supply configured to dispense a volume of reactant fluid to the fluid flow path;
  a fuel cell configured to receive at least a portion of the volume of reactant fluid from the fluid flow path to an anode or a cathode of the fuel cell;
  a passive pressure swing valve comprising a first fluid channel and a second fluid channel; and
  a reservoir configured to receive a portion of the volume of reactant fluid and a volume of byproduct water displaced from an outlet of the fuel cell,
  wherein:
    the passive pressure swing valve is arranged along the fluid flow path between the reactant supply and the fuel cell such that the fluid flow path extends between the reactant supply and a passive pressure swing valve first fluid channel, between the passive pressure swing valve first fluid channel and the fuel cell, between the fuel cell and the reservoir, and between the reservoir and a passive pressure swing valve second fluid channel;
    the system is configured to facilitate a bi-directional flow of reactant fluid through the fuel cell, and
    the first fluid channel is in fluid communication with the second fluid channel.

* * * * *